United States Patent [19]
Aznar et al.

[11] Patent Number: 5,684,797
[45] Date of Patent: Nov. 4, 1997

[54] ATM CELL MULTICASTING METHOD AND APPARATUS

[75] Inventors: Ange Aznar, Saint Laurent du Var; Jean Calvignac, La Gaude; Daniel Orsatti, Cagnes Sur Mer; Dominique Rigal, Nice; Fabrice Verplanken, La Gaude, all of France

[73] Assignee: International Business Machines Corporation, Armonk, N.Y.

[21] Appl. No.: 548,030

[22] Filed: Oct. 25, 1995

[30] Foreign Application Priority Data

Apr. 5, 1995 [EP] European Pat. Off. ............. 95480038

[51] Int. Cl.⁶ .................................................. H04L 12/56
[52] U.S. Cl. ........................ 370/390; 370/392; 370/397; 370/413
[58] Field of Search .................................. 370/389, 390, 370/395, 396, 397, 412, 413, 428, 429, 905, 392

[56] References Cited

U.S. PATENT DOCUMENTS 5,301,192  4/1994  Henrion ............................ 370/94.1
5,305,311  4/1994  Lyles ................................ 370/60
5,394,397  2/1995  Yanagi et al. .................... 370/60.1
5,402,415  3/1995  Turner ............................. 370/60
5,436,893  7/1995  Barnett ........................... 370/60.1
5,535,197  7/1996  Cotton ............................. 370/60

FOREIGN PATENT DOCUMENTS 0420493  9/1990  European Pat. Off. .

OTHER PUBLICATIONS

European Search Report.

*Primary Examiner*—Alpus H. Hsu

[57] ABSTRACT

A multicasting apparatus and method for an Asynchronous Transfer Mode (ATM) switch is described, which uses a single target port (TP) vector attached to each outgoing ATM cell. The target port vector contains identifiers of each port to which the cell has to be transmitted. After transmission of the cell, the identifier relating to respective target port is erased from the TP vector. Hence the TP vector contains only identifiers of target port to which the cell has not yet been transmitted. When the TP vector contains no identifiers, the storage location at which the ATM cell is stored during the transmission, is freed for another cell. Unicast and multicast traffic are treated identically.

6 Claims, 5 Drawing Sheets

FIG. 2

ATM CELL MULTICASTING METHOD AND APPARATUS

FIELD OF THE INVENTION

The present invention relates to a method and device for controlling the transmission of Asynchronous Transfer Mode (ATM) cells to the output ports of an ATM switch. Particularly it pertains to the multicasting functions of an ATM switch.

BACKGROUND OF THE INVENTION

In an ATM Network, ATM cells have to be multicasted or broadcasted on several ATM connections, for example by servers communicating with several clients such as video distribution, file distribution or any other sort of one-to-many type of communication. In an ATM communication node a multiple port output adapter function receives a cell from an ATM switch fabric and transmits it to its ports. In an high speed network, this function must be done by hardware supported by microcode. Administrative overhead (that is, the time spent in setting up a multicasting operation as opposed to time spent in transferring ATM cells) must be kept at a minimum to sustain substantially the same aggregate switch throughput in both the unicast mode and the multicast mode.

A trivial solution for multicast operation is to duplicate the given cell on the various queues dedicated to each of the ports involved in the broadcast. This known method, although easy to implement, has severe disadvantages with regard to the performance as cell data transfers are performed N times if a distribution to N ports is requested.

Another known solution, as described in European Patent application EP-A-0-622922, does not queue the cell data at each port involved in the distribution, but instead makes use of a control block (pointer) which points to the address of a buffer in which the ATM cell being multicasted is stored. This solution avoids multiple cell data transfers, providing better performance than the method described above. However, in this process, control pointers have to be generated, released, enqueued and dequeued in each of the output queues. Further, the current ATM cell must be released from storage after the cell is transferred from last port involved in the multicast. This requires also a dedicated and specific process step.

SUMMARY OF THE INVENTION

With regard to the known art, it is the object of the current invention to provide a high performance and easily-implemented process for multicast operations in an ATM switch.

In the following, the main features of the invention are summarized. The functions and hardware resources used for unicast cell handling are used without additional overhead. For both unicast and multicast operations, cell data movement is performed only once, upon reception from the switching fabric into an output adapter section of the switch. The enqueue and dequeue processes are also the same for unicast and multicast cells.

The multicast function is done without incurring administrative overhead by using a target port vector (or TP) which remains attached to the cell until all operations necessary to handle the cell transmission are executed. This TP identifies at any given time, the remaining target ports to which the cell is to be transmitted. When the TP vector becomes empty, i.e. no longer contains any valid target port identifier, the address at which the cell is stored during the transmission operation, is released for use by another incoming cell.

Compared to the known art, the current invention provides a common system interface and handling for both the multicast process as well as the unicast process:

When the connection is set up, the ATM connection control block is loaded with the same TP vector structure for a point-to-point (unicast) connection or a point-to-multipoint (multicast) connection. In the point-to-point case, only one identifier is set in the TP vector representing the single target port. In a point-to-multipoint case, several identifiers are set in the TP vector representing the several ports involved in the cell fan-out. There is no multicast or unicast unique information to be placed in the ATM connection control block. This process allows easy system network control evolution from an initial point-to-point connection to a point-to-multipoint connection by adding parties, i.e. additional target ports. When another party should be added, the system network control adds an identifier, representing the new target port, to the TP vector. Thus, an ATM connection can be changed "on the fly" from point-to-point to point-to-multipoint and vice versa.

These and other novel features and advantages of the invention will be explained in detail with reference to the following figures and technical description.

DETAILED DESCRIPTION OF THE PREFERRED EMBODIMENT

Figure 1:
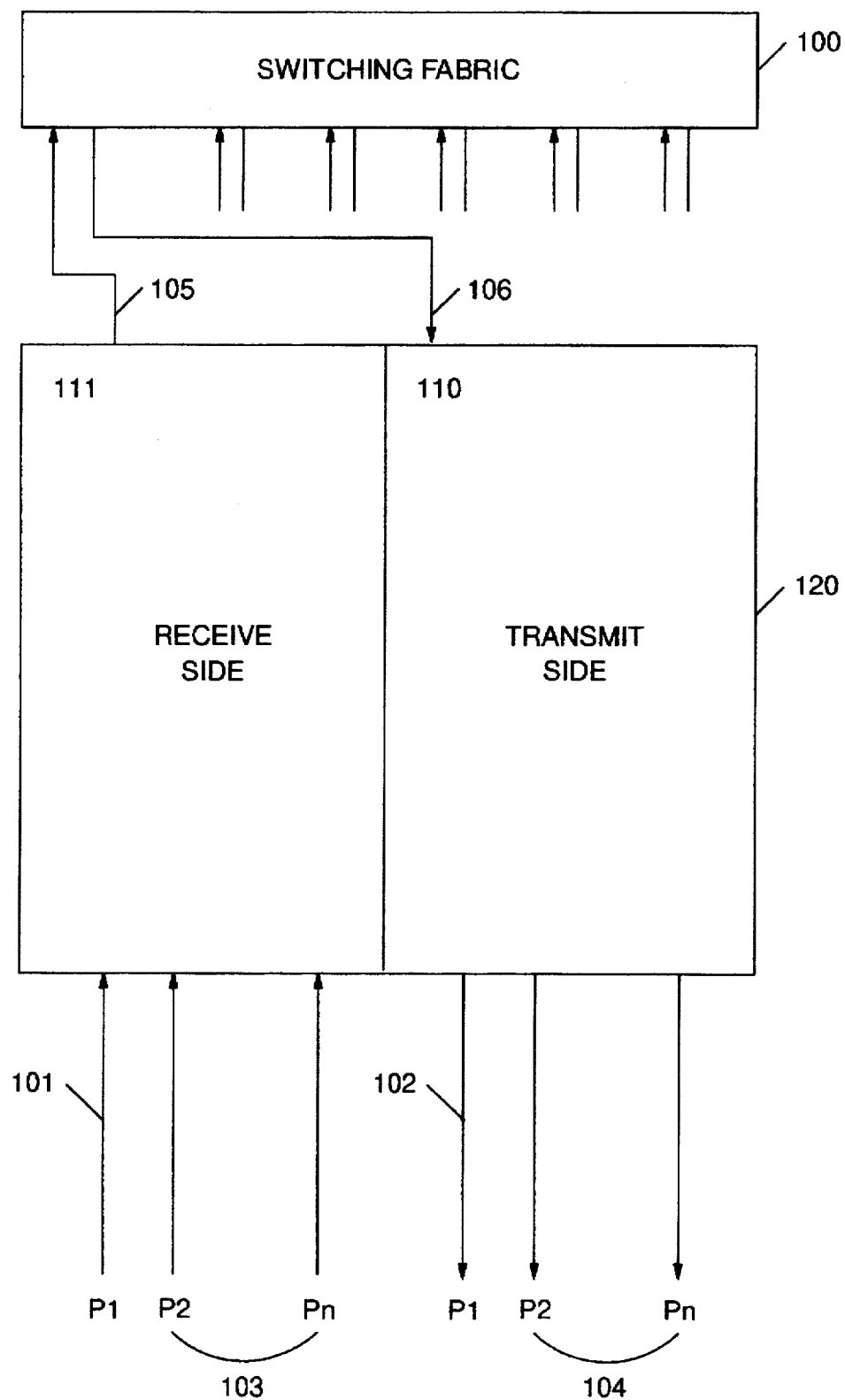
FIG. 1 is a view of a communication system which represents the environment of the invention.

FIG. 1 depicts the environment of the invention, which is represents an ATM communication system in which input and output port adapters 120 are connected to a switching fabric 100. Each adapter is composed of a receive side function 111 which handles the traffic from the input ports 101–103 to the switching fabric bus 105 and of a transmit side function which handles the traffic from the switching fabric bus 106 towards the output ports 102–104. An adapter serves several ATM ports, the ports in each set being denoted as P1, P2 to Pn.

Figure 2:
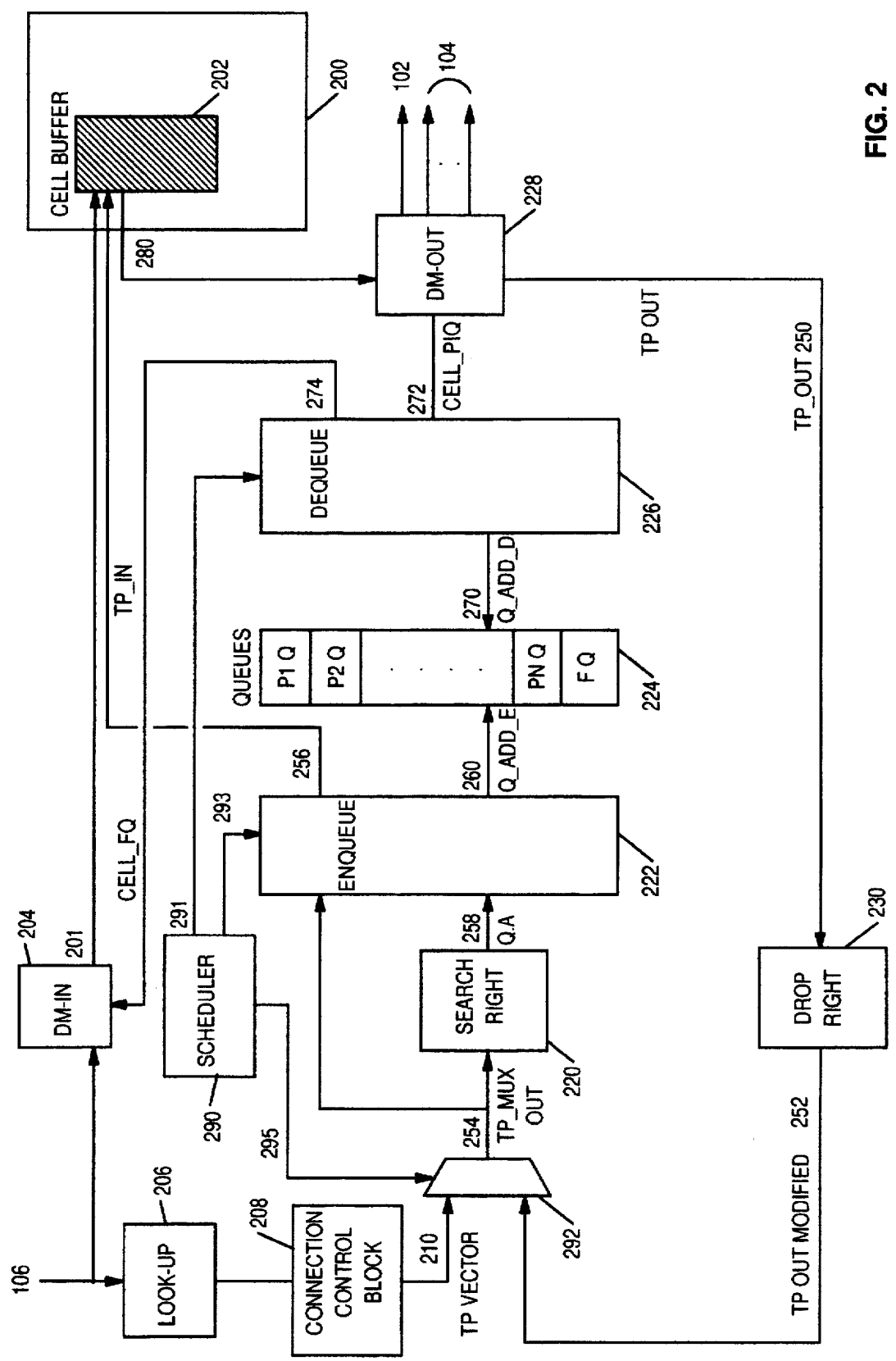
FIG. 2 is a detailed view of an output port adapter of the switching fabric of FIG. 1.

The invention concerns the handling of the ATM unicast and multicast traffic and resides in transmit side 110 of the adapter detailed in FIG. 2. Element 224 represents the storage queues for each output port, including control block pointers. A Free Queue FQ section holds the pointers to the queue of free buffers and port queues P1Q . . . PnQ hold the pointers to the queues dedicated to the output ports attached to the adapter 120. A cell buffer, preferably a sixty-four byte structure 202, resides in a transmit side store 200. When a cell is received from the switching fabric via the bus 106, it is moved to and stored in cell buffer 202. This is achieved by a data movement function DM-IN 204 which receives a free queue output identifier CELL_FQ 274 from the dequeue circuit 226.

At the same time, the header of the received cell is read by a look-up function 206. The look-up function 206 is not part of the invention and can be implemented in several ways such as content addressable memory, pattern search tree or direct table. In a preferred embodiment of the invention, the look-up function 206 is implemented by a direct table. As a result of the look-up operation, a connection control information block 208 is generated, which contains an initial target port vector TP_vector 210, which in turn contains the identifiers of all target ports for the current ATM cell.

It is important to note that the target port identifiers stored in the TP_vector 210 are preferably neither encoded addresses for a port (e.g., '0 ... 011' in the case of port P3), nor pointers to a chained multicast tree. Instead, the TP-vector 210 has a width related to the total number n of output ports attached to the adapter. In this preferred embodiment, a single bit i is associated to the port Pi and is set, i.e., changed to '1', if the port Pi belongs to the multicast tree. As a matter of course, the scope of the invention should not be restricted to the present one-bit identifiers, as other formats of the identifier are readily feasible.

In the preferred embodiment, the sequence in which the TP identifiers are processed is established by their respective positions within the TP vector, i.e. the 'right' bit corresponds to port P1 while the 'left' bit corresponds to port Pn. Other priority schemes are feasible, although the current scheme has the advantage of being very easy to implement. As examples, in the case where the number of output ports n is equal to four, a unicast connection over which cells are to be forwarded on port P3 has a TP_vector equal to '0100', while a multicast connection on which cells are to be forwarded on ports P1, P3 and P4 has a TP-vector equal to '1101'.

A multiplexer 292 feeds an enqueuer. The multiplexer 292 is controlled by a scheduler 290 through line 295. The scheduler 290 manages various tasks that need to be performed in the transmit side function 110. In the particular case of the multiplexer 292, the scheduler 290 manages two incoming flows towards the enqueuer 222, one of flows those being the request for enqueueing an incoming cell. The output of the multiplexer 292 is the TP_MUX_OUT vector 254, which is input to the search_right_encoder element 220, the function of which is detailed in FIG. 3. The result is a PORT-ENC 258 signal which is the encoded value of the port to which the cell will be forwarded, say '0011' in the case the port is P3. The enqueuer 222 receives both Port-enc 258 and the TP_MUX_OUT vector 254. The enqueue box 222 writes the TP_MUX_OUT vector 254 into cell buffer 202 as TP—in signal 256. The vector is written in the overhead part of the cell buffer 202 whose size—sixty-four bytes—is larger than the standard ATM cell size of fifty-three bytes. The enqueuer 222 translates the encoded port value 258 into an appropriate address Q_ADD_E 260 in order to enqueue the received cell in the queue of the identified output port.

Figure 3:
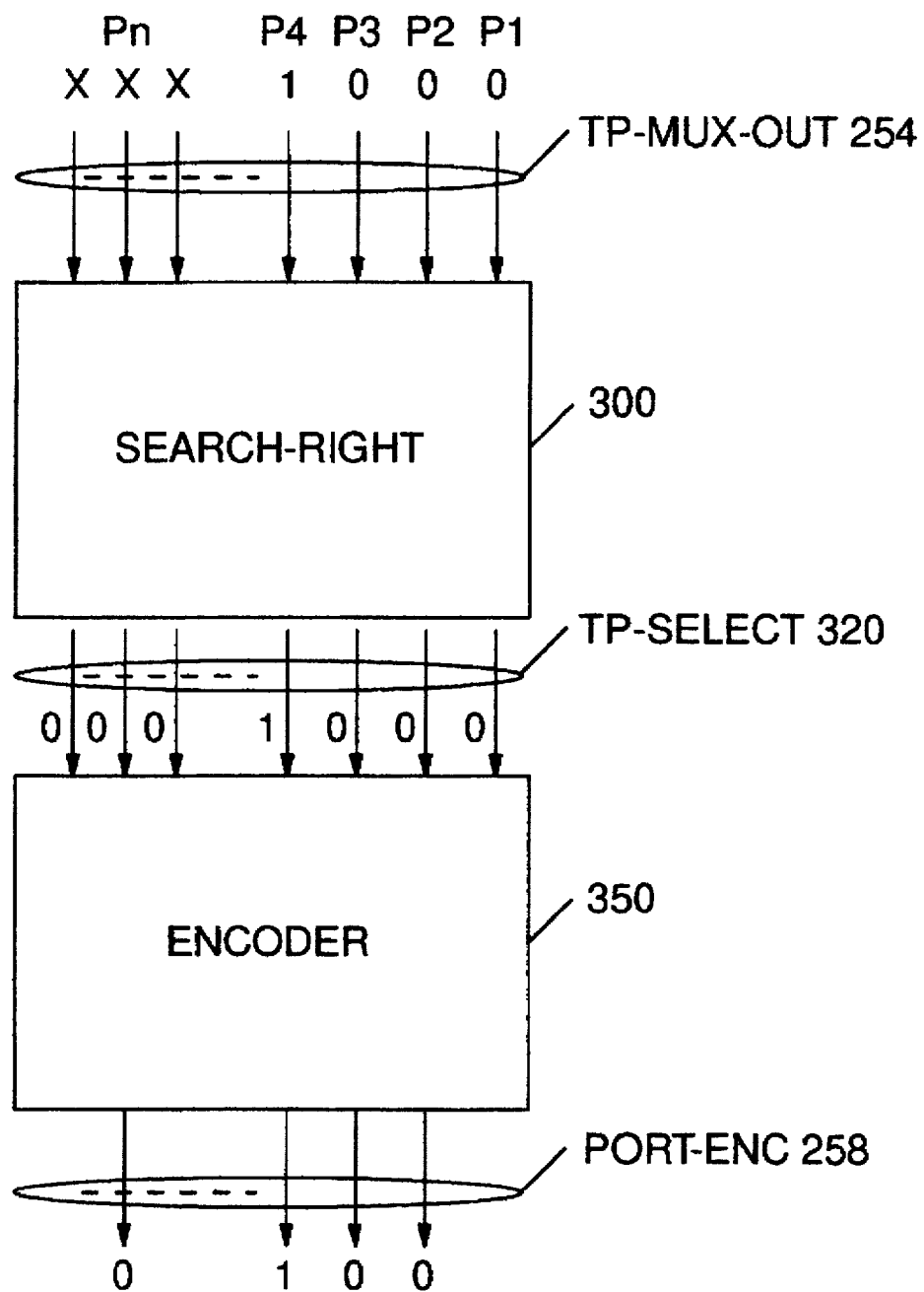
FIG. 3 is a detailed view of the a Search Right function included in the output adapter of FIG. 2.

FIG. 3 illustrates the operation performed by the search_right_encoder function 220. The TP_MUX_OUT vector 254 is applied to the search-right function 300 which starting from the right-most bit, corresponding to port P1, detects the first bit having a value of one. In the given example, the bit corresponding to port P4 is selected ignoring the values of bit corresponding to ports P5 to Pn, since bit P4 equals '1' and bits P1, P2, P3 equals '0'. The resulting vector TP-select 320 has the same width as the TP_MUX_OUT vector, say n, and has a single bit equal to '1', bit corresponding to port P4 in the given example. The TP-Select vector 320 is applied to the encoder function 350. The resulting vector is the encoded value of the selected port, PORT-ENC-258. The width of the vector 258 is n' where n' is the upper integer of Log2 (n).

Returning to FIG. 2, a dequeuer 226, on request (connection 291) from the scheduler 290, dequeues a cell from the queue for port Pi. The dequeue result is the address of a storage location in cell buffer 202, say CELL_PiQ 272. This address is supplied to data-movement DM_OUT element 228, which operates to move the contents of the storage location content to the appropriate output port 102–104 over connection 280.

At the same time, the DM_OUT element 228 reads, from the overhead part of the cell buffer 202, the TP vector that had been written by the enqueuer 222. A read vector TP_OUT 250 generated by DM_OUT element 228 is an input to the Drop Right element 230, the function of which is detailed in FIG. 4.

Figure 4:
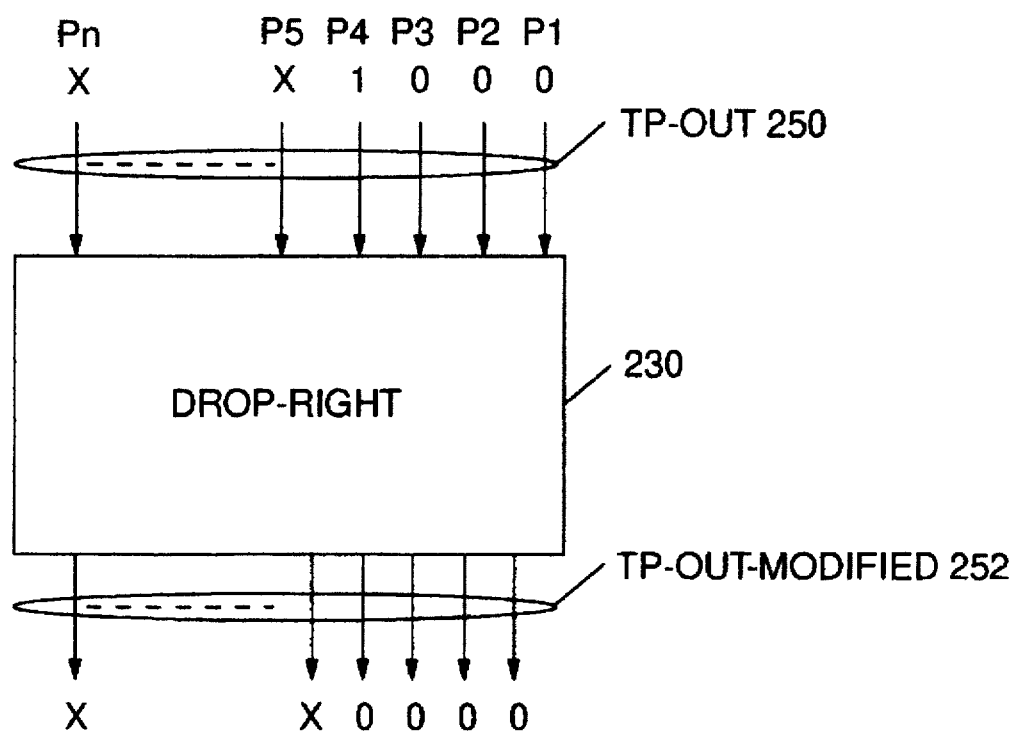
FIG. 4 is a detailed view of a Drop Right function implemented in the output adapter of FIG. 2.

FIG. 4 illustrates the Drop Right function 230. The TP-OUT vector 250 is applied to the drop_right function 230 which searches for the first bit, staffing from the right, whose value is '1' and then resets that bit to '0'. In the given example, the bit corresponding to port P4 is reset. The output of the function 230 is a new target port vector TP_OUT_MODIFIED 252 in which the bit identifying the last output port to receive the cell is reset to '0'. The TP_OUT_MODIFIED vector 252 is an input to multiplexer 292 and is the second flow towards the enqueuer 222. Data movement operations 228 can be done such that the multiple ATM cells of the multicast fan-out can have identical or different ATM headers/labels. A cell follows the same process 'enqueue-dequeue-DM_OUT' through elements 220, 222, 226, 228, 230 until the result of the Drop Right processing, say TP_OUT_MODIFIED 252, is a null vector containing only '0s'. In that case, the result of the search_right_encoder box 220 Port_enc will be '0 ... 0' and hence the cell will not be enqueued in a port queue PiQ but in the queue of free buffers say FQ (cell released since the fan_out process is terminated). The successive 'enqueue-dequeue-DM_OUT' processes result in multicasting the cell stored in the cell buffer 202 to the appropriate output ports.

Figure 5:
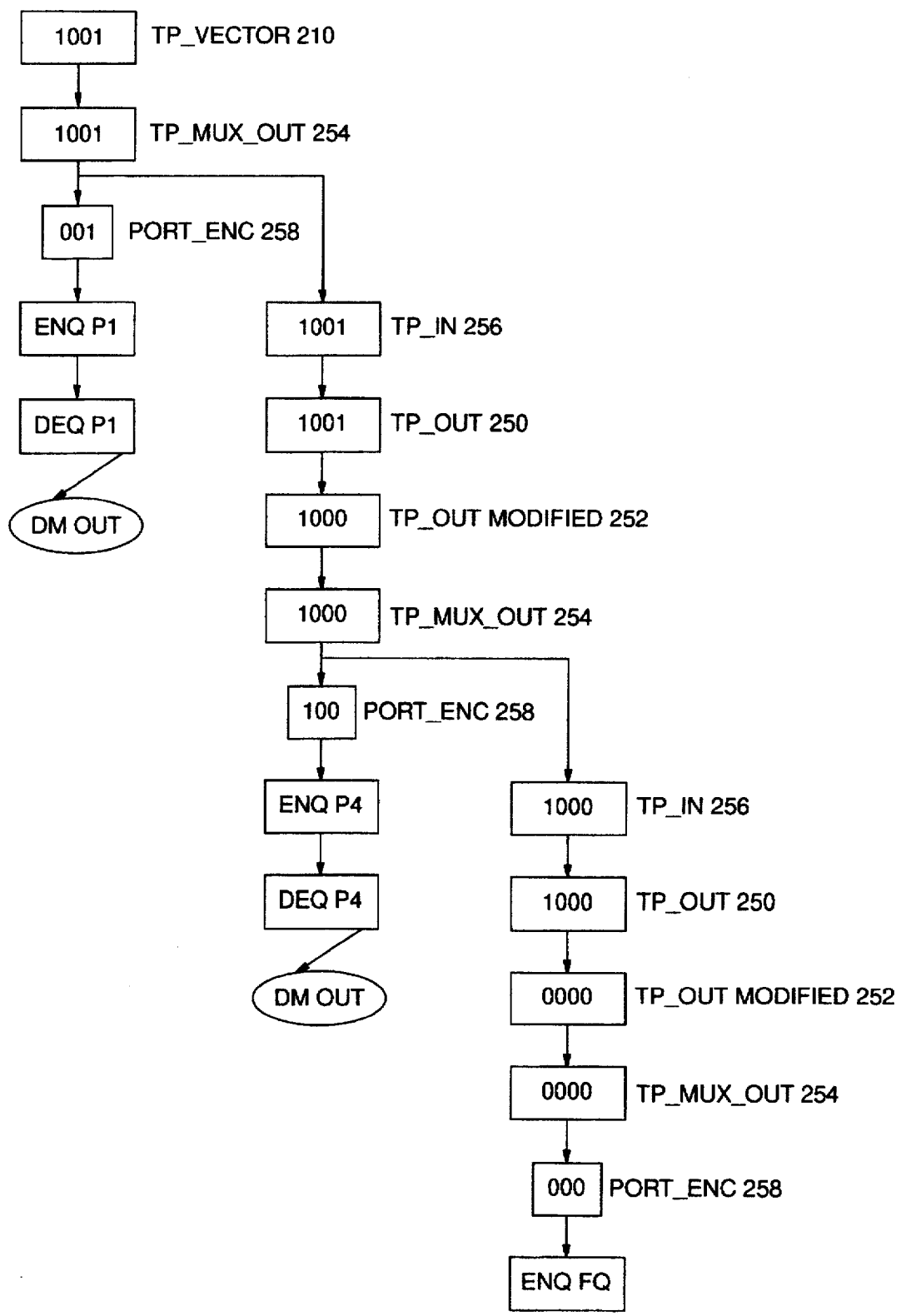
FIG. 5 is an example of the processing of a target port vector—through the output adapter of FIG. 2.

FIG. 5 is an example of a multicast operation, in an adapter assumed to have four output ports. In particular, FIG. 5 describes how the target port vector is handled during the cell processing in the transmit side function. In the example of FIG. 5, the cell is to be multicasted to output ports P1 and P4. The initial TP vector in the connection control block is '1001', which triggers an enqueue operation through the Search Right function 220 for the queue of port P1. The initial TP vector is written in the cell buffer. Once the cell is dequeued and forwarded to port P1, the process begins another iteration. The value of the TP vector at the beginning of the second iteration will be '1000' since the Drop Right function operating on the TP_OUT vector 250 (which initially corresponds to the initial TP vector) will have set the rightmost bit, representing port 1, from "1" to "0". This new TP vector triggers an enqueue in the queue of port P4.

At the conclusion of the second iteration, which results inthe cell being forwarded to port P4, a third iteration is begun. However, the new value of the TP vector modified by the Drop Right function will be '0000' since the bit corresponding to P4 will be reset to "0". A TP vector of 0000 enqueues the cell into the queue of free buffers.

While there has been described what is considered to be a preferred embodiment of the invention, variations and modifications in that embodiment will occur to those skilled in the art. Therefore, it is intended that the appended claims shall be construed to include both the preferred embodiment and all such variations and modifications as fall within the true spirit and scope of the invention.

What is claimed is:

1. In a data switch having a switching fabric, at least one input port adapter and at least one output port adapter, improved apparatus within at least one of said output port adapters for distributing data cells received from said switching fabric to one or more target ports on said output adapter, said improved apparatus comprising:

a) a memory element for storing each data cell received from said switching fabric;

b) a connection control block generator for generating a connection control block identifying each target port to which a given stored data cell is to be written;

c) means for generating a target port vector having multiple positions, each position being associated with a different one of the output ports on said output adapter and initially having either a pointer indicating the given stored data cell is to be written to the associated output port or a null value indicating that the given stored data cell is not to be written to the associated port;

d) means for transferring the given stored data cell from said memory element to one of the target ports identified by a pointer in the target port vector e) means for modifying the target port vector in response to a data cell having been written to the associated output port to remove the associated pointer;

f) means for reiterating steps d) and e) above until all pointers have been removed from the target port vector; and g) means responsive to the elimination of all pointers from the target point vector to make the memory element location occupied by the given data cell available for storage of a new data cell.

2. Apparatus as defined in claim 1 wherein the target port vector comprise a binary word having a number of bit positions equal to the number of possible output ports on said output adapter and wherein each pointer comprises a binary one value written into one of said bit positions.

3. Apparatus as defined in claim 2 wherein said data cell transferring means comprises:

a) means for reading each position in the current target port vector beginning at one end of the vector until the first position having a pointer is found; and b) means for retrieving the associated data cell from the memory element for forwarding to the output port identified by said first position.

4. Apparatus as defined in claim 3 wherein said modifying means further comprises means for setting the binary 1 value in said first position to a binary 0 value.

5. For use in a data switch having a switching fabric, at least one input port adapter and at least one output port adapter, a method of writing a data cell received at the input port adapter to one or more target ports on said output port adapter, said method comprising the steps of:

a) storing the data cell to be directed;

b) identifying the target ports for the data cell;

c) generating a target port vector associated with the data cell, said target port vector having a number of data positions equal to the number of ports on the output port adapter, each portion being associated with a different one of the output ports, with the data in each of said data positions having a first value only if the data cell is to be written to the associated port and otherwise having a second value;

d) reading successive data positions in the target port vector to determine whether any of such data positions includes the first value;

e) if a data position in the target port vector is encountered having the first value, then writing the data cell to the port associated with said data position, modifying the target port vector by setting the contents of said data position. to the second value, and repeating the step d) above;

f) if no data position is encountered having the first value, terminating the method as to the current data cell.

6. A method as set forth in claim 5 wherein the target port vector comprises a multi-bit data word in which the number of bits is at least as large as the number of output ports on the output adapter.

* * * * *